March 4, 1969 W. J. DUDA 3,430,476
CORRUGATING MACHINE
Filed Nov. 14, 1966

INVENTOR
WILLIAM J. DUDA
ATTORNEYS

INVENTOR
WILLIAM J. DUDA
BY
ATTORNEYS

INVENTOR
WILLIAM J. DUDA
BY
ATTORNEYS

United States Patent Office 3,430,476
Patented Mar. 4, 1969

3,430,476
CORRUGATING MACHINE
William J. Duda, Elmwood, Conn., assignor to American
Cyanamid Company, Stamford, Conn., a corporation
of Maine
Filed Nov. 14, 1966, Ser. No. 594,032
U.S. Cl. 72—190                 6 Claims
Int. Cl. B21b 21/00; B21d 13/02

ABSTRACT OF THE DISCLOSURE

Disclosed is a machine for corrugating foil diagonally with respect to the web direction of the foil comprising a pair of complementary dies movable between open and closed positions and operable upon closing to form at least one corrugation extending from one edge of the foil to an opposite edge, gripper means operable in timed relation to the die motion to hold the foil against movement when the dies are out of engagement with the foil, means to move the dies and the foil relative to the gripper means in the web direction, said relative movement being a result of first and second components including a first component of feed in one direction and a second component of feed in a direction substantially normal thereto. Also disclosed is a method of corrugating sheet stock including presenting with a pair of mating dies a preliminary groove of the stock, reworking preliminary groove with finishing dies, and gripping and initiating a subsequent preliminary groove before the reworking of the initial preliminary groove is completed.

---

This invention relates to the manufacture of light weight core material and more particularly a low density construction material such as that disclosed in the U.S. patent to Pajak, No. 3,096,053 owned by the assignee of the instant application.

The instant application is directed to a machine for the manufacture of corrugated material such as, for example, aluminum foil, paper, glass cloth, Mylar and polyethylene foils. The Pajak patent referred to above teaches the method of making a block of cross laminated corrugated foil wherein the corrugations are at a right angle to the web direction as the foil is unwound from a roll. The product resulting from the patented method in said Pajak patent is sold under the American Cyanamid trademark "Trussgrid." Such product is described as one characterized by cross-laminated corrugations in block or slice form. It is a stable, easy machining, self-venting core material with nearly isotropic compressive and crush strength for use in structrual sandwich and energy absorbers.

A similar cross-laminated product may be made from the corrugated foil according to the instant invention and the foil corrugated by the machine of the instant invention is characterized by corrugations which extend diagonally with respect to the web direction of the foil. It will be understood by those skilled in the art that with the instant machine and method a block of core material may be formed practically any desired length without splices or changes in density throughout the length of the block. This is to be distinguished over the folded product resulting from the method taught by the above-identified Pajak patent.

The term "truss type" as used herein means low density core material of stacked corrugated foil wherein the corrugations are diagonally disposed with respect to the web direction of the foil or with respect to spaced parallel edges of the foil. Such "truss type" low density core may be cut in slices and provided with cover sheets to make a honeycomb sandwich or the truss type core material may be cut and machined into various shapes for energy absorption or for use as a structural member in aircraft and the like.

A machine incorporating the present invention can be used to accurately form diagonally corrugated strips without waste wherein the corrugations extend at substantially any desired angle with respect to the longitudinal dimension of the strip. The corrugations are accurately formed with flat and parallel crests and troughs joined to inclined walls by relatively sharp corners. These corrugation grooves are formed without substantial stretching or thinning of the material, so that weakened sections do not occur.

The illustrated embodiment of the machine provides a feed mechanism operable to produce two components of strip feed. One component is perpendicular to the corrugation groove and the other lengthwise thereof. The two components of feed are separately and independently adjustable so that the strip can be fed diagonally through the machine at any desired angle within the range of adjustment of the machine. Consequently, the corrugated strips can be formed of substantially any length and the corrugations can be formed at any desired angle with respect to the longitudinal dimension or web direction of the strip. The feed mechanism is arranged to permit adjustment of the machine while the machine is operating.

The forming dies extend across the entire strip and simultaneously form the entire length of the groove. Also, the unformed portion of the strip is free to move toward the dies while the grooves are being formed. Therefore, wrinkling, stretching or thinning does not occur.

The objects of the invention as outlined here are achieved by a corrugating machine which forms corrugations in the foil diagonally with respect to the web direction of the foil and wherein such corrugations are formed by opposed complementary dies which engage the foil and carry it bodily through space in the web direction. Such complementary dies move continuously in a closed path and one corrugation is completed during each cycle of die movement through such path. In the machine of the present invention the dies which follow the path here described are composite dies including preliminary and finishing dies which are movable in space relative to each other during their travel through such path.

The machine of the present invention is also characterized by gripping or holding means arranged to engage the foil and hold the foil against travel when the corrugating dies are free with respect to the foil.

It is an important object of this invention to provide a novel and improved method and apparatus for producing a plurality of deformations in strip material.

It is another important object of this invention to provide a novel and improved method and apparatus for forming corrugations in sheet material wherein the corrugations extend diagonally with respect to the longitudinal dimension of the sheet.

It is another important object of this invention to provide a novel and improved machine, according to the last preceding object, including power feed means arranged to diagonally feed a piece of strip material through the machine.

It is still another important object of this invention to provide a novel and improved machine, according to the last preceding object, wherein the feed means produces two feeding components of movement, one of which is substantially perpendicular to the corrugations formed by the machine, and the other of which is lengthwise of the corrugations.

It is still another object of this invention to provide a novel and improved machine, according to the last preceding object, wherein the length of each component of feed is separately and independently adjustable while the machine is operating.

It is still another object of this invention to provide a novel and improved machine for forming corrugations in strip material combining shaping dies and gripping means arranged to accurately form the corrugations without stretching the strip material by progressively forming the grooves of the corrugations to their finished shape.

It is still another object of this invention to provide a novel and improved machine, according to the last preceding object, which produces corrugations having flat and parallel crests and troughs connected by straight inclined walls.

It is still another object of this invention to provide a novel and improved machine according to the last preceding object, wherein feed means are provided to diagonally feed a strip with respect to the groove direction of the corrugations so that the strip may be used to form truss type honeycomb or the like.

Further objects and advantages will appear from the following description and drawings wherein.

Figures 1, 2, 3, 3A, 3B, 4:
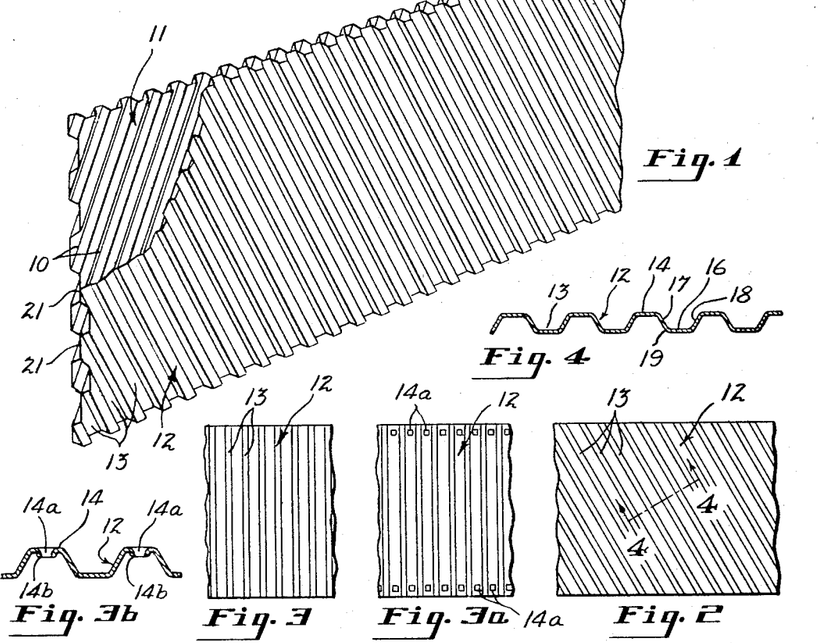
FIGURE 1 is a fragmentary, perspective view of two strips forming a truss type honeycomb illustrating the diagonal arrangement of the corrugations.
FIGURE 2 is a fragmentary, plan view of one of the strips in FIGURE 1 corrugated diagonally of the web direction.
FIGURE 3 is a fragmentary, plan view of a corrugated strip of the type normally used to form honeycomb wherein the corrugations extend perpendicular with respect to the web direction.
FIGURE 3a is a plan view of foil having transverse corrugations with the flat coplanar surfaces of alternate corrugations having pierced openings along the margin of the foil.
FIGURE 3b is an enlarged transverse sectional view showing a flange at the periphery of the pierced opening in the foil.
FIGURE 4 is a fragmentary section taken along 4—4 of FIGURE 2.

FIGURE 1 illustrates one form of truss type honeycomb. In this figure only two corrugated sheets are illustrated. The grooves 10 forming the corrugations in the first sheet 11 are inclined with respect to the web direction of the foil and extend diagonally across the sheet from one side to the other. The second sheet 12 is positioned against the first sheet 11 and is also formed with inclined or diagonal corrugation grooves 13. The two sheets are arranged so that the grooves 10 on the sheet 11 extend diagonally in one direction and the grooves in the sheet 12 extend diagonally in another direction, so that the grooves 10 and 13 cross each other when the two sheets 11 and 12 are positioned in abutting relationship.

FIGURE 4 is a fragmentary, enlarged, cross section of the sheet 12, taken along a plane perpendicular to the length of the groove 13, and illustrates the shape of the grooves. Each groove is formed by a crest portion 14 and a trough portion 16 joined by flat but inclined side walls 17 and 18. It is important to form the grooves 13 so that the crests 14 and troughs 16 are flat and extend along planes which are parallel to each other, so that when two sheets are bonded a good surface contact will be provided between the troughs and crests of adjacent sheets where the sheets abut. It is also desirable to form the side walls or inclined walls 17 and 18 as straight planar surfaces, joining the crests 14 and troughs 16 at relatively sharp corners 19.

In forming truss type honeycomb, the crests 14 and troughs 16 are normally coated with suitable adhesives and the sheets are stacked in a suitable frame with alternate sheets arranged so that the grooves extend along opposite diagonals. When a sufficient number of sheets are stacked in the frame, the adhesive is cured. The size of the end products, such as an airfoil, determines the height of the stack, the web dimension of the foil and the length of each sheet.

The abutting and bonded areas 21 between the crests and troughs of adjacent sheets are generally diamond shaped and are spaced from each other so that the zones between adjacent sheets are in communication throughout the length and width of the sheets. Therefore, any volatile matter resulting from the curing of the adhesive is free to pass out of the truss type honeycomb. Also, the truss type honeycomb is useful where flow of fluids through the honeycomb is desired. In fact, such a structure is used for heat exchange by appropriately connecting the passages for entry and discharge of the fluids being heated or cooled. In addition, such truss type honeycomb does not require separate ventilating means to prevent the building up of pressures or vacuums within the cells of the honeycomb when the honeycomb is installed in aircraft and where altitude changes the environmental pressure.

FIGURE 3 illustrates the type of corrugations which are used in typical honeycomb wherein the grooves forming the corrugations extend perpendicular to the web direction of the foil. In conventional honeycomb core formed of this FIGURE 3 type of sheet, the crest of one sheet abuts the trough of the adjacent sheet throughout its length. When the cover sheets are applied to such core and the cover sheets are adhesively bonded, closed hexagonal cells are formed. Conventional corrugated sheets with corrugations normal to the web direction can also be manufactured by the machine of the present invention.

Figure 5:
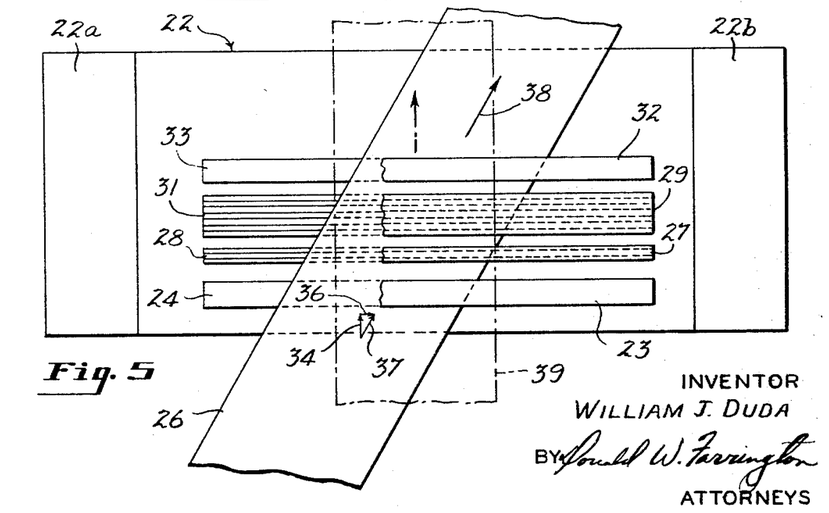
FIGURE 5 is a schematic plan view of the machine incorporating the present invention illustrating how a strip can be diagonally fed through the machine.

FIGURE 5 is a schematic, plan view of the illustrated machine incorporating this invention. The machine includes a frame 22 including upper and lower gripping jaws 23 and 24, respectively. The lower gripping jaw 24 is mounted directly on the frame 22 and the upper gripping jaw 23 is vertically movable for gripping and releasing the strip 26. Upper and lower forming dies 27 and 28, respectively, are movable between opened and closed positions and are shaped to form a single groove in the strip 26 each time they move to a closed position. Secondary gripping and forming dies 29 and 31 are carried with the forming dies 27 and 28, respectively. A pair of die clearing plates 32 and 33 are mounted at the exit side of the secondary gripping dies 29 and 31.

The forming dies 27 and 28 are power operated and move, in addition to the opening and the closing directions, horizontally in two directions. The first direction is a forward feed direction, indicated by the arrow 34, which is perpendicular to the grooves formed in the strip 26. Second component of feeding is indicated by the arrow 36 and is in alignment with the direction of the grooves formed in the strip. The resulting feed direction is indicated by arrow 37. The foil, such as aluminum foil, is pulled from a roll and the web direction of the foil is as indicated by arrows 37 and 38. The roll of foil and the unwind strand are not shown. Separate feed means which are separately adjustable, adjustably control the length of each of the components of feed 34 and 36.

The forward component of feed indicated by 34 is adjusted to equal the spacing between adjacent grooves 13 and is changed whenever the dies 27 and 28 are changed to produce different sizes of corrugations. The lateral component of feeding 36 is adjusted so that the resulting feed 37 is in alignment with the longitudinal or web direction of the strip 26 when the strip is fed through the machine at the proper angle to form the grooves 13 at the desired angle with respect to the web direction 38.

The gripping jaws 23 and 24 grip the strip 26 in the unformed portion thereof and hold the strip stationary while the strip forming dies 27 and 28 are clear of the strip. As the secondary gripping dies 29 and 31 close to grip the formed portion of the strip, and before the forming dies 27 and 28 commence the first forming operation, the gripping jaws 23 and 24 open to permit the strip to be moved into the machine from the unwind roll. This provides stock for the forming of the groove without stretching the metal foil and insures adequate feeding of the foil into the machine. The feeding of the foil is on demand as determined by the dies 27 and 28 and by the secondary gripping and forming dies 29 and 31.

The adjustment of the lateral component of feed and the angular disposition of the foil supply to the machine determines the angle of feeding. For example, if it is desired to corrugate at 45° to the web direction, the unwind stand carrying the foil is arranged so that the foil strip 26 is at 45° to the corrugating dies. The lateral component 36 of the feed is adjusted so that it equals the advancing component 34. In the illustrated machine the lateral component of feed can be adjusted to substantially zero length so that a strip may be fed through the machine as indicated by the phantom outline foil strip 39. In the other extreme of adjustment the foil 26 may be fed through the machine at an angle of about 30° to the corrugating dies.

Referring now to FIGURES 6 through 14, the lower gripping jaw 24 is supported by the machine frame 22 on rigid post members 41. The upper gripping jaw 23 is mounted for limited vertical movement on the lower gripping jaw 24 by means of bolts 42 and is normally biased toward the lower gripping jaw 24 for gripping the strip by springs 43. A mechanism, which will be described in detail below, is operable to lift the upper gripping jaw 23 against the action of the springs 43 to release the strip during predetermined portions of the machine cycle.

The first corrugating operation is accomplished by a pair of complementary vertically reciprocating dies 27 and 28. The upper die 27 has a longitudinal rib which moves the foil into a complementary groove in the lower die 28.

The upper die 27 (best illustrated in FIGURE 12) is mounted on an upper cross head assembly 44 and the lower die 28 is mounted on a lower cross head assembly 46. Position adjustment of the dies on the cross heads is provided by screws 45.

Figure 12:
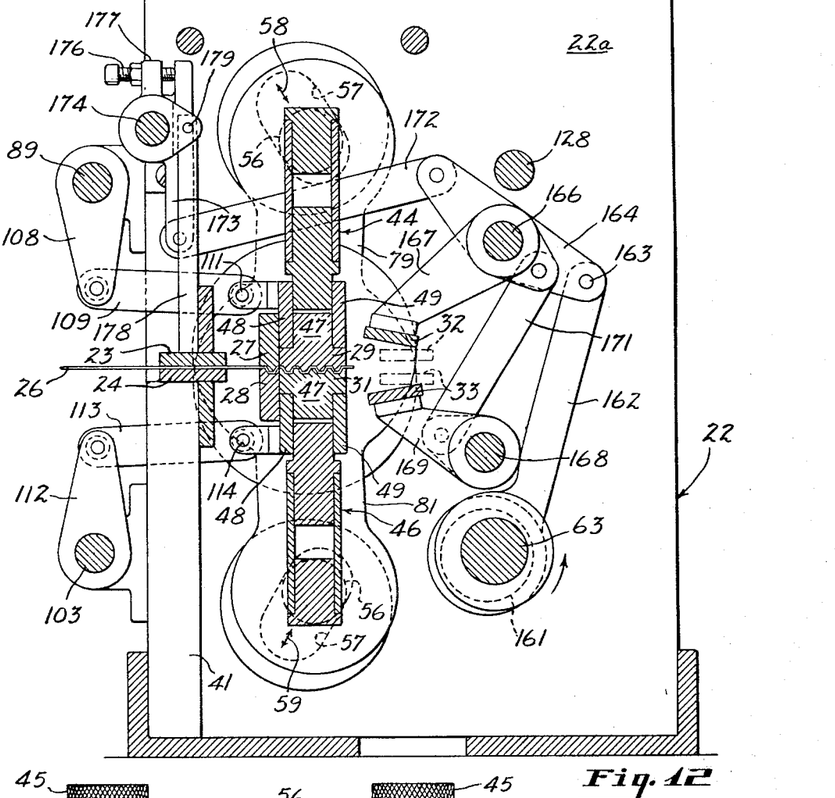
FIGURE 12 is a cross section taken generally along 12—12 of FIGURE 6.
Figure 13:
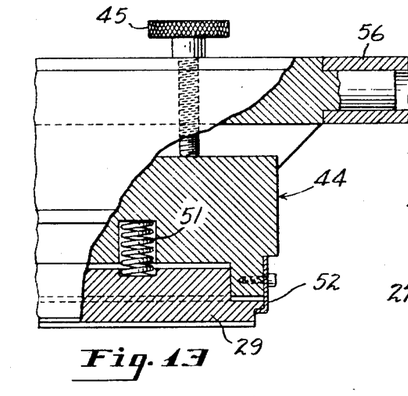
FIGURE 13 is a fragmentary, side elevation, partially in section, illustrating the structure of one of the die cross heads.
Figure 14:
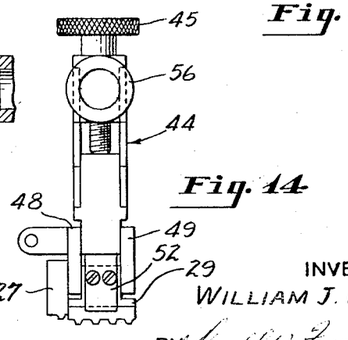
FIGURE 14 is an end view of one of the die cross heads.

A forming operation in the nature of a finishing operation is effected by dies 29 and 31 which are also carried by the upper and lower cross heads 44 and 46, respectively. Each of the complementary forming dies 29 and 31 is formed with an integral rib 47 which fits between side plates 48 and 49 on the respective cross heads to guide the dies 29 and 31 but allow limited vertical movement of each of the dies with respect to its associated cross head assembly. Spring 51 (illustrated in FIGURE 13) resiliently urges the secondary gripping jaws in a direction toward each other and normally maintain the gripping jaws in an extended position against a stop 52 mounted at each end of the cross head. As the two cross head assemblies 44 and 46 move toward each other the two dies 29 and 31 move to their closed position before the cross heads 44 and 46 complete their closing movement. The parts are proportioned and adjusted so that the forming dies 27 and 28 are still spaced apart the depth of a corrugation to prevent forming of the initial corrugation until after the previously corrugated portion of the foil 26 is gripped by the dies 29 and 31. During the final closing movement of the cross head assemblies 44 and 46 the forming dies 27 and 28 are carried to final closed position and the first corrugating step is complete. The position of the elements illustrated in FIGURE 12 is the final closed position.

The major portion of the work on the foil is accomplished by the dies 27 and 28 which form a single corrugation across the foil. The dies 27 and 28 are positive in the sense that there are no resilient elements between the dies and the power means. The dies 27 and 28 may be adjusted so that the single corrugation which they form approximates the final state. The corrugations thus formed by the dies 27 and 28 need not have sharp corners and the bottom of the trough in the corrugation may be lower with respect to the unworked portion of the foil than in the finished corrugation. This provides that the initial corrugating step will compensate for the spring-back in the metal foil.

The dies 29 and 31, on the other hand, are resiliently carried into the work by the springs, such as the springs 51. The dies 29 and 31 may be considered as finishing dies in that they complete to final form the bottom of the trough, the sides and the crest so as to produce sharp corners. Each single corrugation formed by the dies 27 and 28 is thus progressively worked four times in the finishing dies 29 and 31 as the corrugated material moves through the machine.

In addition to the load limiting function of the springs 51, such springs serve as stripper springs in moving the foil away from the working surfaces of dies 27 and 28 as the cross heads 44 and 46 move away from each other.

The movement of the cross head assemblies 44 and 46 is controlled by three separate linkages. The first linkage produces the opening and closing movement of the dies, the second linkage produces the forward feed movement of the foil and the third linkage produces the lateral feed movement of the foil.

Figure 6:
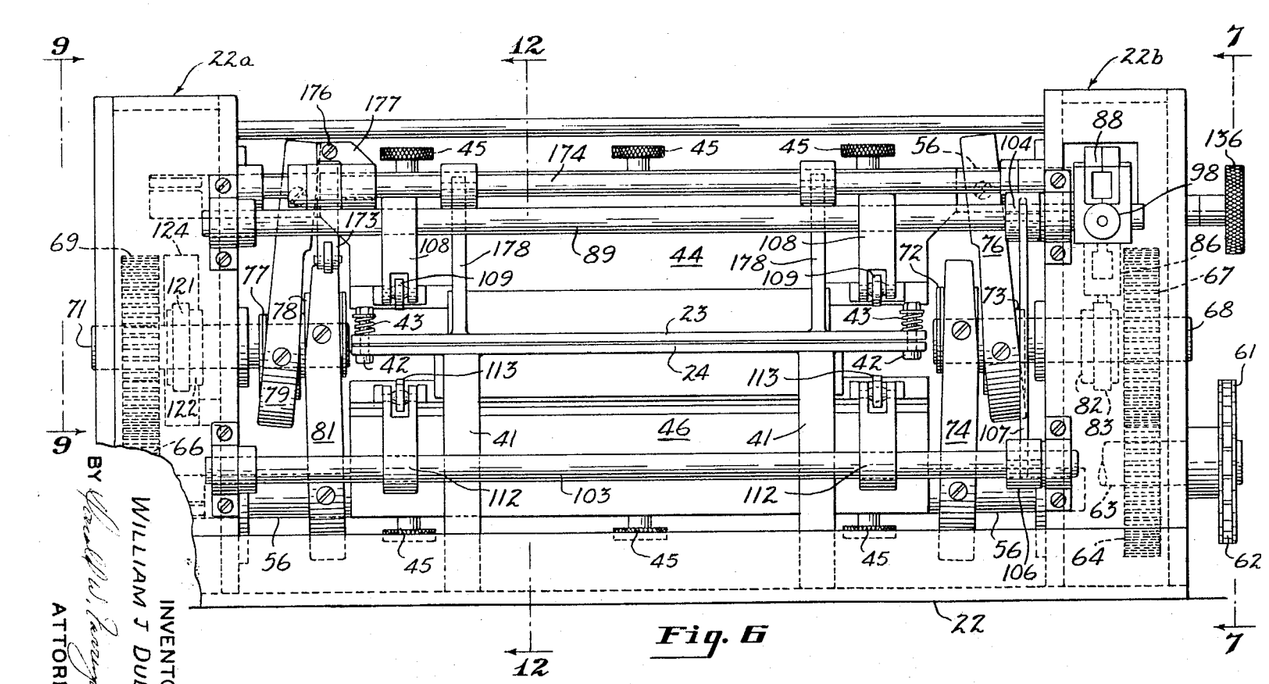
FIGURE 6 is an elevation of a machine incorporating the present invention illustrating the general structural arrangement at the foil entrance side thereof.

In connection with the first linkage and with reference to FIGURE 6 of the drawings, the upwardly extending connecting rod 76 at the right-hand end of the machine and the depending connecting rod 74 at the right-hand end of the machine raise and lower the assemblies 44 and 46 so that they move forward and away from each other. Similar connecting rods 79 and 81 at the left-hand end of the machine are moved in unison with the first connecting rods named.

With respect to the second linkage which is utilized in the foil feeding movement, reference is made to FIGURES 6 and 12 of the drawings. The shafts 89 and 103 are mounted on the machine frame so as to be oscillated and carry the crank arms 108 and 112 in oscillation through an arc. Such oscillation by means of links 109 and 113 moves the cross head assembly and the foil engaging parts thereof fore and aft relative to the foil supply at 26 and thus moves the foil into position for the corrugating operation.

Figure 9:
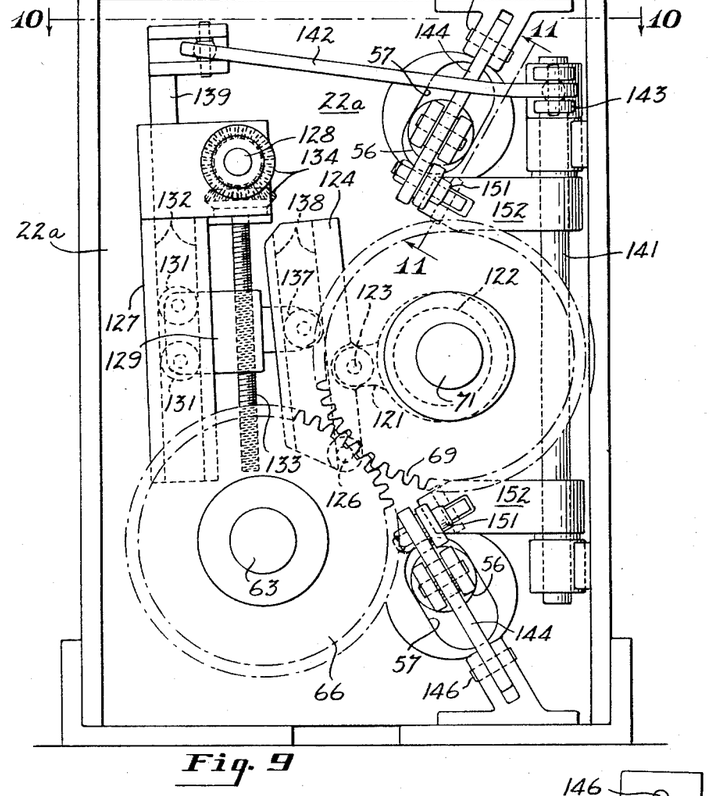
FIGURE 9 is an end view, taken generally along 9—9 of FIGURE 6, with the end plate removed to illustrate the adjustable lateral drive mechanism.
Figure 10:
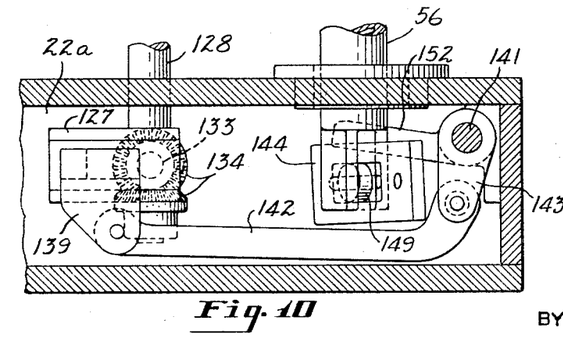
FIGURE 10 is an enlarged, fragmentary, plan view taken generally along 10—10 of FIGURE 9 with parts removed for purposes of illustration.
Figure 11:
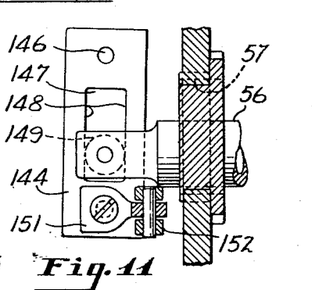
FIGURE 11 is a fragmentary section taken generally along 11—11 of FIGURE 9.

With respect to the third linkage, which is utilized for the lateral movement of the cross heads, reference is made to FIGURES 9, 10 and 11 wherein the vertically disposed shaft 141 is rocked about its vertical axis so as to swing the projecting arms 152 through a limited arc. The motion at the outer ends of the arm 152 is transmitted to the upper and lower cross head assemblies so that the cross head assemblies are moved in unison through a path which carries the foil from left to right as the foil enters the corrugating machine.

It will be understood as the description proceeds that if it is desired to form conventional transverse corrugations which are normal to the web direction of the foil, the third linkage may be rendered inoperative or adjusted to a position where no lateral movement is imparted to the foil by the cross heads.

The two cross head assemblies 44 and 46 are similar and complementary in structure. The upper assembly 44 is arranged in a depending relation in the frame 22 and the lower cross head assembly 46 is arranged in an upwardly extending direction in the frame 22. Each of the cross heads is provided with a laterally extending tubular portion which projects into the gear boxes 22a and 22b at the left and right-hand end of the frame 22 as viewed in FIGURE 6. The tubular portions 56 ride in inclined slots 57 formed in the walls of the gear boxes 22a and 22b.

Figures 15A, 15B, 15C, 15D, 15E, 16A, 16B:
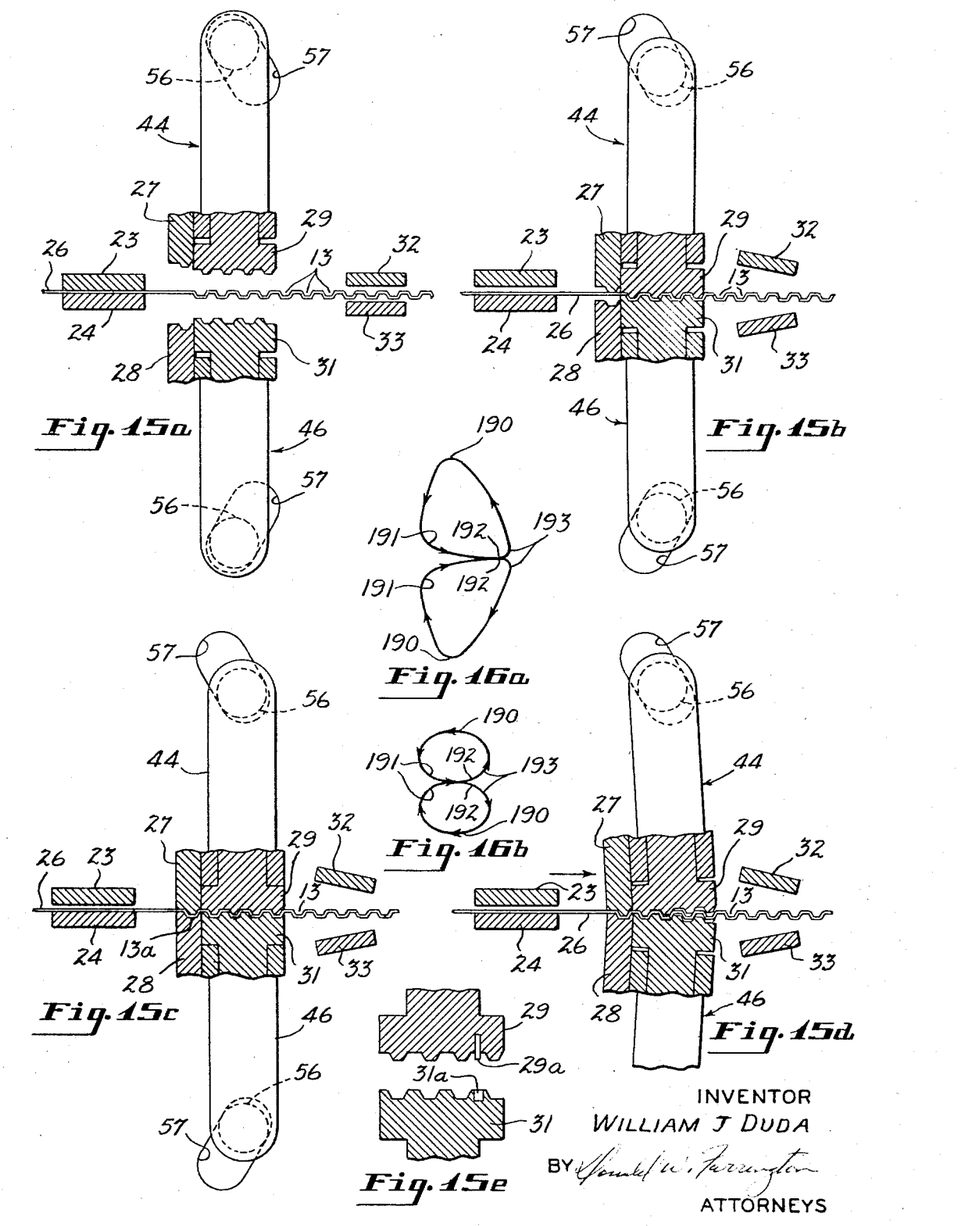
FIGURES 15a through 15d are progressive, schematic illustrations of the forming operations occurring during a single cycle of operation.
FIGURE 15e illustrates the means carried by the corrugating dies to provide pierced openings along the marginal edge of corrugated foil.
FIGURE 16a is a diagram of the forward feed movement of the dies.
FIGURE 16b is a diagram of the lateral feed movement of the dies.

As will be observed from reference to FIGURES 15a to 15d, inclusive, the arrangement is such that when the dies are fully open, the tubular portions 56 are located in space nearer to the foil entrance side of the machine then when the dies are fully closed (FIGURE 15c).

The drive for producing opening and closing movement of the two cross heads 44 and 46 is as follows. The power for the machine is supplied through a chain 61, illustrated in FIGURE 7, which is connected to a sprocket wheel 62 on a cross shaft 63. The shaft 63 extends across the machine and is provided with two drive gears 64 and 66. The drive gear 64 is located at the right end of the machine, as viewed in FIGURE 6, and meshes with a driven gear 67 mounted on a stub shaft 68. The drive gear 66 is mounted at the left end of the shaft 63 and engages a driven gear 69 on a stub shaft 71 at the left end of the machine.

The right hand stub shaft 68 is provided with a pair of similar eccentric bearings 72 and 73 positioned 180° apart. The first eccentric bearing 72 is connected to the cylindrical extension 56 of the lower cross head assembly 46 by a connecting rod 74 and the second eccentric bearing 73 is connected to the cylindrical extension 56 of the upper cross head assembly 44 by a connecting rod 76. Self-aligning bearings are used at both ends of each of the connecting rods 74 and 76.

A similar pair of eccentric bearings 77 and 68 are provided on the stub shaft 71 adjacent to the left end of the cross heads and these eccentric bearings are connected to the cylindrical extensions 56 of the upper and lower cross head assemblies 44 and 46 by connecting rods 79 and 81, respectively. Here again, the eccentrics 77 and 78 are positioned on the stub shaft at 180° positions with respect to each other.

The gearing driving the two stub shafts 71 and 68 is arranged so that the two stub shafts rotate at the same speed and in a fixed orientation with respect to each other. In the position illustrated in FIGURE 6 the two eccentrics 72 and 78 are in their upper position and the associated cross head assembly 46 is in its upper extreme position. At the same time the two eccentric bearings 73 and 77 are in their lowermost position and the upper cross head assembly 44 is also in its lowermost position.

As the two stub shafts 68 and 71 rotate through one revolution from the illustrated position the upper cross head assembly 44 is raised through its upper extreme position and returned to its lower or closed extreme position illustrated. At the same time the lower cross head assembly 46 is lowered through its lowermost position and returned to its raised or closed position illustrated. With this arrangement the two cross head assemblies move apart and together between their opened and closed positions each time the stub shaft 68 and 71 rotate through one revolution.

Figure 7:
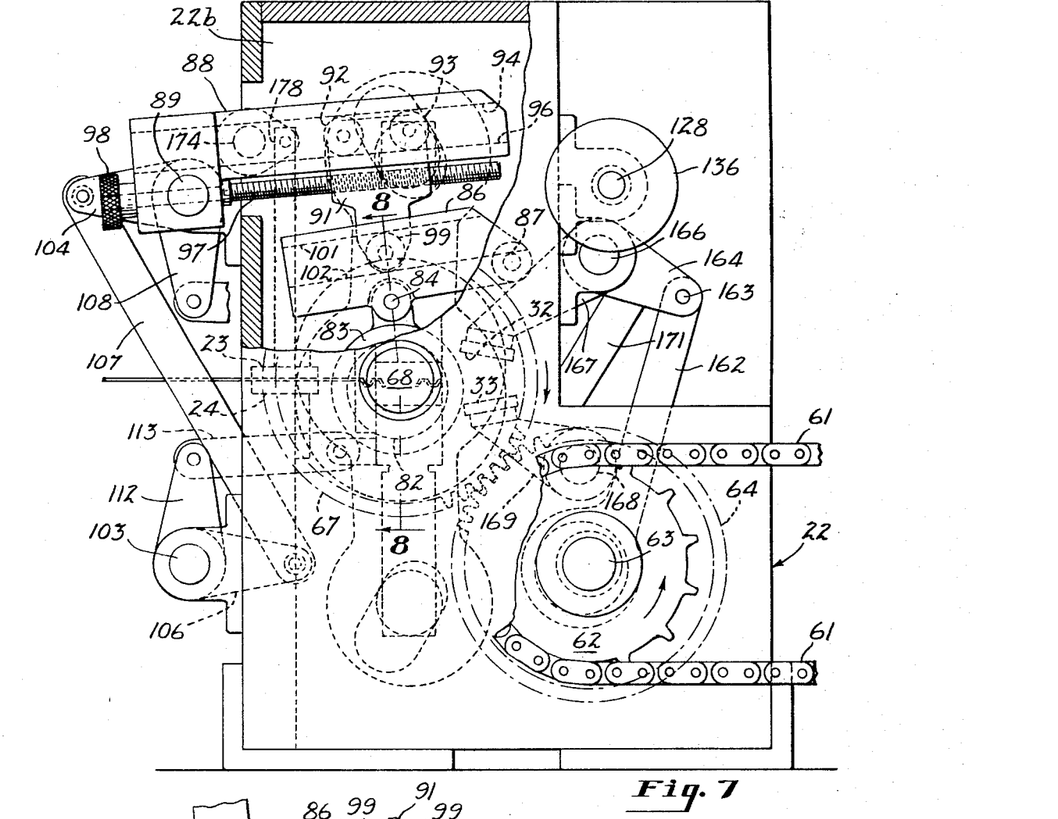
FIGURE 7 is an end elevation, taken generally along 7—7 of FIGURE 6, with the end plate partially removed, illustrating the linkage for producing the forward feed of the strip.
Figure 8:
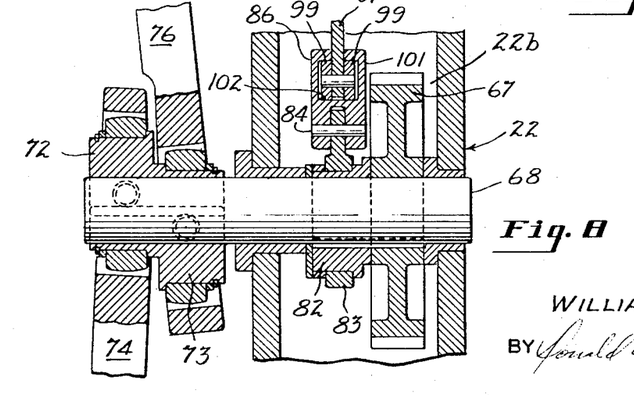
FIGURE 8 is an enlarged, fragmentary section of the drive mechanism for opening and closing the dies.

The forward component of feeding is produced by a mechanism best understood by referring to FIGURES 7, 8 and 12. Mounted on the stub shaft 68 is an eccentric bearing 82 with a short connecting rod 83 journaled thereon. The upper end of the connecting rod 83 is pivotally connected at 84 to a rocker arm 86 which is in turn pivoted on the machine frame at 87. As the eccentric 82 is rotated by the stub shaft 68 the connecting rod 83 produces oscillating rotation of the rocker arm 86 about its pivot axis 87. The magnitude of this oscillating movement of the eccentric bearing 82 and its timing is determined by the orientation of the eccentric 82.

A second rocker arm 88 is secured to a cross shaft 89 journaled on the machine frame 22 and is connected to and driven by the first rocker arm 86 through an adjustable connecting link 91. The connecting link 91 is provided with two pair of spaced rollers 92 and 93 which engage opposed parallel surfaces 94 and 96 extending lengthwise of the rocker arm 88. An adjusting screw 97 is axially fixed at its outer end against movement with respect to the rocker arm 88 and threads through the connecting link 91 so that clockwise rotation of the adjusting screw 97 causes the connecting link 91 to be moved to the left as viewed in FIGURE 7. A knob 98 is provided to permit easy rotation of the screw 97.

Journaled on the lower end of the connecting link 91 is a pair of rollers 99 which are positioned between a pair of opposed and parallel guide surfaces 101 and 102 formed in the rocker arm 86. With this structure oscillating movement of the rocker arm 86 produces oscillating pivotal movement of the rocker arm 88 and in turn the cross shaft 89 with the magnitude of the oscillating movement of the latter is determined by the adjusted position of the connecting link 91. For example, if the connecting link 91 is moved to the right from the position of FIGURE 7, the rollers 91 are carried through an arc having a length which is decreased in magnitude because the arc is closer to the pivot axis 87. At the same time the angle of movement of the rocker arm 88 is also decreased because the connecting link is then located at a position radially spaced from the axis of the shaft 89 by a greater distance.

The upper cross shaft 89 is connected to a lower cross shaft 103 by a linkage which produces oscillating movement of the lower cross shaft 103 having a magnitude which is substantially equal to the magnitude of oscillation of the upper cross shaft, but is in an opposite direction. This linkage includes an arm 104 secured to the upper cross shaft 89, an arm 106 secured to the lower cross shaft 103 and a pivoted link 107 connected therebetween. The arm 104 extends to the left from its cross shaft 89 and the arm 106 extends to the right with the connecting link 107 extending diagonally therebetween. The various links are proportioned so that when the upper cross shaft 89 rotates in a clockwise direction the lower cross shaft 103 rotates in an anticlockwise direction with substantially the same velocity and the same arc of movement.

Referring now to FIGURE 12, the upper cross shaft 89 is connected to the upper cross head assembly 44 by a similar pair of arms 108 and pivoted links 109. The pivotal connection of the links 109 on the upper cross head assembly 44 is at 111 a point spaced well below the cylindrical extensions 56, so as the upper cross shaft 89 rotates in an anticlockwise direction, as viewed in FIGURE 12, the lower edge of the upper cross head assembly 44 and the dies 27 and 29 supported thereby are moved to the right.

A similar driving connections is provided between the lower cross shaft 103 and the lower cross head assembly 46 by means of arms 112 and pivoted links 113 pivoted on the lower cross head assembly 46 at 114. Since the lower cross shaft 103 rotates in a clockwise direction, at the same time the upper cross head assembly moves in an anticlockwise direction and at the same speed, the upper edge of the lower cross head assembly and the dies 28 and 31 supported thereby move to the right as viewed in FIGURE 12. Because the magnitude of the oscillations of the two cross shafts 89 and 103 is adjustable by the adjusting screw 97 the magnitude of the component of feed in the forward direction is adjustable.

The adjustable linkage for producing the lateral component of feeding movement is contained in the left end of the machine as viewed in FIGURE 6 and is best illustrated in FIGURES 9 through 11. A short connecting rod 121 is journaled on an eccentric 122 (illustrated in FIGURE 6) on the stub shaft 71 and is pivotally connected at 123 to a rocker arm 124. The rocker arm 124 is in turn pivoted on the machine frame at 126 and is oscillated about the axis of the pivot 126 through an arc having a magnitude determined by the eccentricity of the eccentric 122 and timed in its oscillation by the position of the eccentric on the stub shaft 71.

A second rocker arm 127 is pivoted on a cross shaft 128 and is connected to the first rocker arm 124 by a connecting link 129. Here again, the connecting link 129 is provided with spaced pairs of rollers 131 which are guided between opposed parallel surfaces 132 on the rocker arm 127 and the link is positioned with respect to the axis of the pivot shaft 128 by an adjusting screw 133. Rotation of the adjusting screw 133 is provided by miter gears 134 mounted on the cross shaft 128 and the adjusting screw 133. An adjusting knob 136 is mounted on the opposite end of the shaft 128 (as illustrated in FIGURE 6 so that the operator can rotate the adjusting screw 133 to provide the desired adjustment of the connecting link 129 externally of the machine and at the same end of the machine as the adjustment for the forward component of feed.

A pair of rollers 137 are also mounted on the connecting link 129 and are movable along opposed parallel surfaces 138 in the rocker arm 124. This connection operates in a manner substantially the same as the adjusting mechanism of the forward component of feed in that movement of the connecting link 129 in a downward direction as viewed in FIGURE 9 decreases the arc of oscillating movement of the second rocker arm 127 and upward movement results in an increase in the arc of rotation theerof.

The rocker arm 127 is provided with an upwardly extending projection 139 connected to a vertical shaft 141 by a pivoted link 142 and an arm 143 on the shaft 141. Here again, self-aligning bearings are utilized to prevent binding. The shaft 141 is therefore pivotally oscillated in a timed manner through an arc having a magnitude adjustable by the movement of the connecting link 129.

The pivotal oscillating movement of the shaft 141 is transmitted to the two cross heads through similar drive linkages associated with each of the cross heads 44 and 46. Therefore, only one of the drive linkages will be described in detail. The drive linkage includes a link 144 pivoted at 146 on the machine frame and provided with an elongated slot 147 best illustrated in FIGURE 11. This slot provides opposed parallel surfaces 148 which guide a roller 149 journaled on the cylindrical end 56 of the associated cross head assembly.

The link 144 is connected through a universal joint type connection 151 to an arm 152 on the shaft 141, so that as the shaft is oscillated by the adjustable drive it causes oscillation of each of the links 144. This oscillating movement is transmitted through the rollers 149 to the associated cross head to produce the later component of feed. When it is desired to manufacture corrugated strips wherein the grooves extend substantially perpendicular to the longitudinal length of the strip, the connecting link 129 is adjusted downward to reduce the arc of oscillation of the second rocker arm 127. When this occurs the various elements are proportioned to position the links 144 so that the opposed surfaces 148 extend along vertical planes. Consequently, the lateral feeding component is shortened.

On the other hand, when diagonally corrugated strips are desired the connecting link 129 is raised to increase the magnitude of oscillations of the second rocker arm 127 and this produces oscillating movement of each of the links 144 which is timed to produce the desired lateral shifting of the cross heads relative to the machine frame. It is recognized that the movement of the rollers 149 along the slot 147 also produces some lateral shifting whenever the links 144 are in positions other than the vertical position and that this movement is compounded with the oscillating movement to produce the resulting lateral component of feed.

The power operation of the gripper jaws 23 and 24 and of the die clearing jaws 32 and 33 is best illustrated in FIGURE 12. Mounted on the main cross shaft 63 is an eccentric 161 around which is journaled a drive link 162. The opposite end of the drive link 162 is pivoted at 163 to a rocker arm 164 secured to a cross shaft 166. The upper die clearing jaw 32 is carried by spaced arms 167 mounted on the shaft 166.

A second cross shaft 168 is pivoted on the machine frame and supports the lower die clearing jaw 33 by means of spaced arms 169. The two cross shafts 166 and 168 are connected for oscillation in an opposite direction by a diagonal connecting link 171 arranged so that when the cross shaft 166 rotates in a clockwise direction the cross shaft 168 rotates in an anticlockwise direction. The various elements are proportioned so as the eccentric 161 rotates through a full revolution the jaws 32 and 33 move between the opened position, shown in full line in FIGURE 12, and the phantom position. The jaws do not provide gripping of the formed portion of the strip 26, but merely hold the strip in a central position clear of the dies as the dies move open.

Operation of the gripper jaw 23 is provided by a linkage including the rocker arm 164, a link 172 pivoted at one end to the rocker arm 164, and an arm 173 pivoted to the other end of the link 172. The arm 173 is journaled on a cross shaft 174. Mounted adjacent to the arm 173 is an adjusting screw 176 threaded through an arm 177 fixed against rotation relative to the cross shaft 174. As the connecting link 172 is pulled to the right, as viewed in FIGURE 12, the arm 173 pivots around the axis of the cross shaft 174 until its upper end engages the adjusting screw 176. When this occurs continued anticlockwise rotation of the arm 173 causes anticlockwise rotation of the shaft 174. A pair of spaced lift members 178 are secured at the lower end on the upper gripping jaw 23 and are pivoted at their upper ends at 179 on arms secured to the cross shaft 174. Consequently, when the cross shaft 174 is rotated in an anticlockwise direction the upper gripping jaw 123 is lifted against the action of the springs 43 to release the strip 26.

Reference should now be made to FIGURES 15a through 15d which illustrate the operation of the machine in progressive positions of a single cycle. In FIGURE 15a the upper cross head assembly 44 is at its upper extreme position and the lower cross head assembly 46 is in its lower extreme position. At this time the cylindrical end portions 56 are at their extreme position in the guide slots 57. Also, at this time the gripper dies 23 and 24 are closed and hold the strip 26 against movement. In addition, the die clearing jaws 32 and 33 are in their closed position and the strip 26 is held clear of the forming dies 27 and 28 and the secondary gripping and forming dies 29 and 31. It should be noted that at this time the secondary gripping and forming dies 29 and 31 are closer together than the forming dies 27 and 28 due to the action of the springs 51.

FIGURE 16a illustrates the path of movement of the two forming dies 27 and 28 with the upper closed loop showing the path of movement of the upper forming die 27 as it moves through one cycle and with the movement represented in a plane perpendicular to the length of the dies. The lower loops in FIGURE 16a is the corresponding path of movement of the lower forming die 28. In FIGURE 16b the upper loop discloses the lateral path of movement of the upper forming die 27 and the lower loop discloses the lateral movement of the lower forming die 28. When the elements are in the position of FIGURE 15a the dies are located at the points 190 in the two FIGURES 16a and 16b. At this point in the cycle the projections and grooves in the dies have moved to the left through a distance of about two thirds of the space between adjacent grooves 13.

As the machine operates the elements move to the position of FIGURE 15b at which time the dies 27 and 28 have moved to the points 191 on the two diagrams in FIGURE 16a and FIGURE 16b. During this portion of the cycle the secondary dies 29 and 31 continue in a leftward direction and close on previously formed grooves 13 in the strip 26. During this same portion of the cycle the two cross heads move laterally to the left as indicated in the diagram of FIGURE 16b and the upper gripping die 23 is raised to release the strip 26. Also, the die clearing jaws 32 and 33 are moved apart. It should be noted that in this point of the cycle the forming dies 27 and 28 have not commenced their forming operation, and the cross heads 44 and 46 are still moving toward each other. Because the cylindrical ends 56 have moved down along the guiding grooves 57 during this portion of the cycle, the upper ends of the cross heads 44 and 46 are moved slightly to the right and the cross heads are inclined slightly with respect to the vertical. The secondary gripping dies 29 and 31 already tightly grip the formed portion of the strip 26 at this point of the cycle, so strip movement is controlled by the movement of the cross head.

As the cross heads continue to move toward each other to the fully closed position they reach the position illustrated in FIGURE 15c. At this point in the cycle the elements there at the points 192 in the two diagrams and the forming dies 27 and 28 are substantially fully closed having completed the forming operation of the groove 13a and the reworking of the formed grooves. The forward feed has also moved the dies 27 and 28 to the right to a position wherein the two cross heads 44 and 46 are in substantial vertical alignment. The gripping jaws 23 and 24 remain open during this movement and the unformed portion of the strip 26 moves to the right to supply the necessary stock to form the groove 13a. Also during this portion of the cycle a part of the lateral feeding has occurred as indicated by the diagram of FIGURE 16b. Because the unformed strip material is free to move during this phase of the cycle and because the dies 27 and 28 are formed so that the strip material can slip freely down into the groove in the die 28 there is no tendency for the strip material to be stretched during the forming of the groove 13a.

When the elements reach the point in the cycle illustrated in FIGURE 15d the dies reach the point 193 in the two diagrams and the feeding operation is completed. Since the dies 27 and 28 are moving to the right between the position of FIGURES 15c and 15d while the upper ends of the cross heads 44 and 46 are not moving to the right, the two cross heads 44 and 46 are not in direct alignment. The timing is arranged so that the opening movement has commenced to prevent pinching of the strip by the dies 27 and 28. Immediately after the position of FIGURE 15d the upper gripping die 23 is allowed to lower under the influence of the springs 43 into gripping engagement with a strip 26, to hold the strip against any movement while the cross heads carry the dies through the open position of FIGURE 15a and back to the gripping position of FIGURE 15b. During this portion of the cycle the die clearing jaws 32 and 33 also move toward their closed position.

It is desirable to arrange the machine so that the feeding is provided by the feeding movement of the cross heads 44 and 46, since the dies carried thereby engage formed parts of the strip and prevent any possible slippage. Consequently, the strip 26 is held stationary when it is gripped by the gripping jaws 23 and 24 and there is no tendency for slippage to occur during the phase of the cycle when the dies are clear of the strip. The accurate formation of the grooves is possible because the forward feed can be adjusted to insure that during each cycle of the machine the strip is fed in a forward feed direction through a distance exactly equal to the spacing between adjacent grooves 13. Similarly, the exact diagonal feed desired can be provided by adjusting the size of the lateral feed component to insure continuous forming of any length of the strip.

Since each groove of the strip is engaged by the initial forming dies 27 and 28 once and by the finish forming and gripping dies 29 and 31 four times, it is possible to produce strip wherein the crests 14 and troughs 16 are flat and parallel and are joined by straight inclined sections 17 and 18. Preferably, the forming dies 27 and 28 are arranged to produce a slight curvature in the portion of the initial groove 13a ultimately formed into the crest 14 and trough 16. This insures that sufficient material will be present for the finish forming and does not require the material to slide around sharp corners as the uniformed strip material moves to the right to supply the material for the groove. Consequently, substantially no stretching occurs. The flat crests 14 and troughs 16 and the sharp corners at 19 are then produced in the subsequent finish forming operations by the dies 29 and 31.

When the machine of the present invention is utilized for making corrugations at right angles to the web direction of the foil and such corrugated material is sheeted and stacked, it is desirable to provide pierced openings along the marginal edge of the corrugated foil. The foil having such pierced openings is illustrated in FIGURES 3a and 3b and the apparatus for piercing such foil is illustrated in FIGURE 15e.

The upper and lower corrugating dies 29 and 31, respectively, are provided with pin and die cavities so that the flat node bond area of the foil is pierced in the last complementary corrugating tools to work the foil as it moves away from the unwind roll. Preferably the pin 29a carried by the upper corrugating die 29 is provided with clearance with respect to the cavity 31a carried by the lower corrugating die 31. The provision of such clearance results in the forming of a peripheral flange 14b around the opening 14a. Alternate sheets of such corrugated material are inverted and stacked with the holes 15a in alignment. Elongated needles or pins are passed downwardly through the aligned openings in the stack and thus the sheets of the stack are prevented from moving relative to each other during the bonding of one sheet to the next adjacent sheet. The flanged characteristic of the pierced openings provides a snug frictional grip on the aligning needles which are pressed down to the aligned openings. With corrugated sheets stacked in this manner considerable pressure may be applied during bonding to the entire stack without any lateral shifting of one sheet relative to the next adjacent sheet in the node bond area.

It will be understood that the stack, after being cured under heat and pressure, may be trimmed along the marginal edges to eliminate the pierced areas. It is important that the piercing be carried out in the final finishing step of the corrugating process so that the flanges, such as 14b, will not be flattened after piercing.

Those skilled in the corrugating art will observe that the apparatus of the present invention is well suited to the forming of new corrugated products. The fact that the apparatus here disclosed may be used to make new corrugated products results from the new corrugating method which is carried out by the apparatus here disclosed. Briefly, the method of my invention comprises the moving of complementary male and female corrugating dies toward each other to engage flat foil material which is free to move in a "feed" direction—that is, a direction away from the unwind roll. Thereafter such corrugating dies are moved away from the unwind roll in a feed direction generally parallel to the plane of the foil to an area which may be described as the die release area. After the corrugated foil has been moved to such die release area or die release position, the foil is gripped in an area spaced from the die engaging and die release area so as to prevent movement of the foil when the corrugating dies are open. Thereafter the corrugating dies are opened to free the corrugating dies with respect to the foil and then the corrugating dies are returned to spaced apart positions in the foil engaging area. Thereafter the grip on the foil is released so that the foil is free to move away from the unwind roll and is carried away from the unwind roll by the movement of the corrugating dies.

The new method is characterized by the complementary corrugating dies traveling a closed path in a counterclockwise direction relative to the unwind roll as illustrated in FIGURES 16a and 16b.

Those skilled in the foil corrugating art will observe that the closed path rotary motion described is not unlike corrugating foil between geared tooth rolls except that the complementary rib-and-trough corrugating means approaches and leaves the relatively flat foil normal to the plane of the flat foil. The vertical elimination of the rocking or rolling action of the rib-and-trough results is an arrangement which will permit forming corrugations such as rectangular corrugations where the side walls are flat and at right angles to the plane of the foil. Numerous other new forms of product, such as diamond-shaped corrugations and semicylindrical shaped corrugations, may be made and in each instance the finishing dies in the movable corrugating heads 29 and 31 hold the foil so that the flat foil being worked must come only from the direction of the unwind roll.

Although a preferred embodiment of this invention is illustrated, it is to be understood that various modifications and rearrangements of parts may be resorted to without departing from the scope of the invention as defined in the following claims.

What is claimed is:

1. A machine for corrugating foil diagonally with respect to the web direction of the foil comprising a pair of complementary dies movable between open and closed positions and operable upon closing to form at least one corrugation extending from one edge of the foil to an opposite edge, gripper means operable in timed relation to the die motion to hold the foil against the movement when the dies are out of engagement with the foil, means to move the dies and the foil relative to the gripper means in the web direction, said relative movement being a result of first and second components including a first component of feed in one direction and second component of feed in a direction substantially normal thereto.

2. A machine as set forth in claim 1 wherein said means to move the dies and foil provides independent adjustment of the length of each of said components of feed.

3. A machine as set forth in claim 1 wherein said relative movement between said dies and gripper is produced by moving said dies, and said gripper operates to hold said strip stationary while said dies are open.

4. A machine as set for the in claim 1 wherein secondary grippers are carried with said dies and engage the corrugated foil before said dies reach their closed position.

5. Apparatus for making corrugated foil wherein the corrugations extend diagonally with respect to the web direction of the foil comprising a frame, a lower cross head assembly mounted for movement in the frame and an upper cross head assembly mounted for movement in the frame, said lower cross head assembly having a corrugating die along the upper edge thereof and said upper cross head assembly having a complementary corrugating die along the lower edge thereof, means to move said upper cross head assembly in a counterclockwise direction through a rotary path and means to move the lower cross head assembly in a clockwise direction through a rotary path, said cross head assemblies being proportioned so that the complementary corrugating dies engage and carry the foil through a part of said rotary path, said means for moving the cross heads in such rotary paths including a linkage to move the cross heads and the foil carried thereby in a path diagonally disposed with respect to the web direction of the foil.

6. Apparatus for making corrugated foil wherein the corrugations extend diagonally with respect to the web direction of the foil comprising a frame, a lower cross head assembly mounted for movement in the frame and an upper cross head assembly mounted for movement in the frame, said lower cross head assembly having a corrugating die along the upper edge thereof and said upper cross head assembly having a complementary corrugating die along the lower edge thereof, a roll of foil mounted to supply foil at one side of the frame, means to move said upper cross head assembly in a counterclockwise direction through a rotary path and means to move the lower cross head assembly in a clockwise direction through a rotary path, said cross head assemblies being proportioned so that the complementary corrugating dies engage and carry the foil from said supply roll through a part of said rotary path, said means for moving the cross heads in such rotary paths including a linkage to move the cross heads and the foil carried thereby in a path diagonally disposed with respect to the web direction of the foil, and means to restrain foil movement when the foil is released by the corrugating dies.

References Cited

UNITED STATES PATENTS

| | | | |
|---|---|---|---|
| 951,630 | 3/1910 | Cooley | 72—406 |
| 3,213,665 | 10/1965 | Robinson | 72—385 |

FOREIGN PATENTS

| | | |
|---|---|---|
| 37/2472 | 5/1962 | Japan. |

CHARLES W. LANHAM, *Primary Examiner.*

LOWELL A. LARSON, *Assistant Examiner.*

U.S. Cl. X.R.

72—385